United States Patent
De Morais et al.

(10) Patent No.: US 9,789,966 B2
(45) Date of Patent: Oct. 17, 2017

(54) AIRCRAFT SEAT ATTACHMENT SYSTEM PROVIDED WITH A SYSTEM FOR LOCKING AN ACTIVATION LEVER AND/OR FOR MAINTAINING A CLAMPING FORCE BY FRICTION

(71) Applicant: ZODIAC SEATS FRANCE, Issoudun (FR)

(72) Inventors: Jose Bernardo De Morais, Chateauroux (FR); Remy Marais, Charost (FR)

(73) Assignee: Zodiac Seats France, Issoudun (FR)

( * ) Notice: Subject to any disclaimer, the term of this patent is extended or adjusted under 35 U.S.C. 154(b) by 109 days.

(21) Appl. No.: 14/425,964

(22) PCT Filed: Sep. 4, 2013

(86) PCT No.: PCT/IB2013/058285
§ 371 (c)(1),
(2) Date: Mar. 4, 2015

(87) PCT Pub. No.: WO2014/037884
PCT Pub. Date: Mar. 13, 2014

(65) Prior Publication Data
US 2015/0284096 A1  Oct. 8, 2015

Related U.S. Application Data
(60) Provisional application No. 61/696,386, filed on Sep. 4, 2012.

(30) Foreign Application Priority Data

May 10, 2013 (FR) ...................................... 1354227
May 10, 2013 (FR) ...................................... 1354229

(51) Int. Cl.
*B64D 11/06* (2006.01)
*B64C 1/20* (2006.01)
*F16B 2/18* (2006.01)

(52) U.S. Cl.
CPC ............ *B64D 11/0696* (2013.01); *B64C 1/20* (2013.01); *F16B 2/18* (2013.01); *Y10T 403/602* (2015.01)

(58) Field of Classification Search
CPC .............. B64D 11/0696; B60P 7/0815; B60N 2/10525; B60N 2/01575
See application file for complete search history.

(56) References Cited

U.S. PATENT DOCUMENTS 4,062,298 A   12/1977   Weik
4,796,837 A * 1/1989   Dowd ................ B64D 11/0696
                                                244/122 R
(Continued)

FOREIGN PATENT DOCUMENTS

DE    102011013688 A1   9/2011
DE    202011108804 U1   1/2012
(Continued)

OTHER PUBLICATIONS

International Patent Application No. PCT/IB2013/058285, International Preliminary Report on Patentability dated Mar. 19, 2015.
(Continued)

*Primary Examiner* — Jonathan Masinick
(74) *Attorney, Agent, or Firm* — Kilpatrick Townsend & Stockton LLP; Dean W. Russell; Anthony L. Guebert

(57) ABSTRACT

The invention relates to an aircraft seat attachment (100) including a body (20), a plunger (30), and an activation lever (50). The activation lever (50) includes a locking system (54) adapted to go from an open position corresponding to a free state of the activation lever (50) to a closed position
(Continued)

corresponding to a locked state of the activation lever (50). The attachment also enables, in a locked state of said attachment, clamping of a seat rail between at least one boss (22) of said body (20) and the plunger (30), which includes a system (41) for maintaining by friction a force clamping the attachment to the rail in the locked state so that the activation lever (50) does not participate in maintaining said clamping force.

17 Claims, 5 Drawing Sheets

(56) References Cited

U.S. PATENT DOCUMENTS

| | | | |
|---|---|---|---|
| 2006/0104740 A1 | 5/2006 | Girardin et al. | |
| 2007/0228215 A1* | 10/2007 | Hudson | B64D 9/003 244/118.1 |
| 2007/0253762 A1* | 11/2007 | Hudson | B64D 11/0696 403/83 |
| 2010/0096502 A1* | 4/2010 | Vanderwolk | B64D 11/0696 244/122 R |
| 2011/0013972 A1* | 1/2011 | Roy | B64D 11/0696 403/109.1 |
| 2011/0133032 A1 | 6/2011 | Marechal | |
| 2011/0253874 A1* | 10/2011 | Marechal | B64D 11/0696 248/503.1 |

FOREIGN PATENT DOCUMENTS

| | | |
|---|---|---|
| EP | 2181885 A1 | 5/2010 |
| WO | 2012100152 A1 | 7/2012 |
| WO | 2015/198278 A1 | 12/2015 |

OTHER PUBLICATIONS

International Patent Application No. Pdt/162013/058285, Search Report and Written Opinion dated Mar. 5, 2014.

* cited by examiner

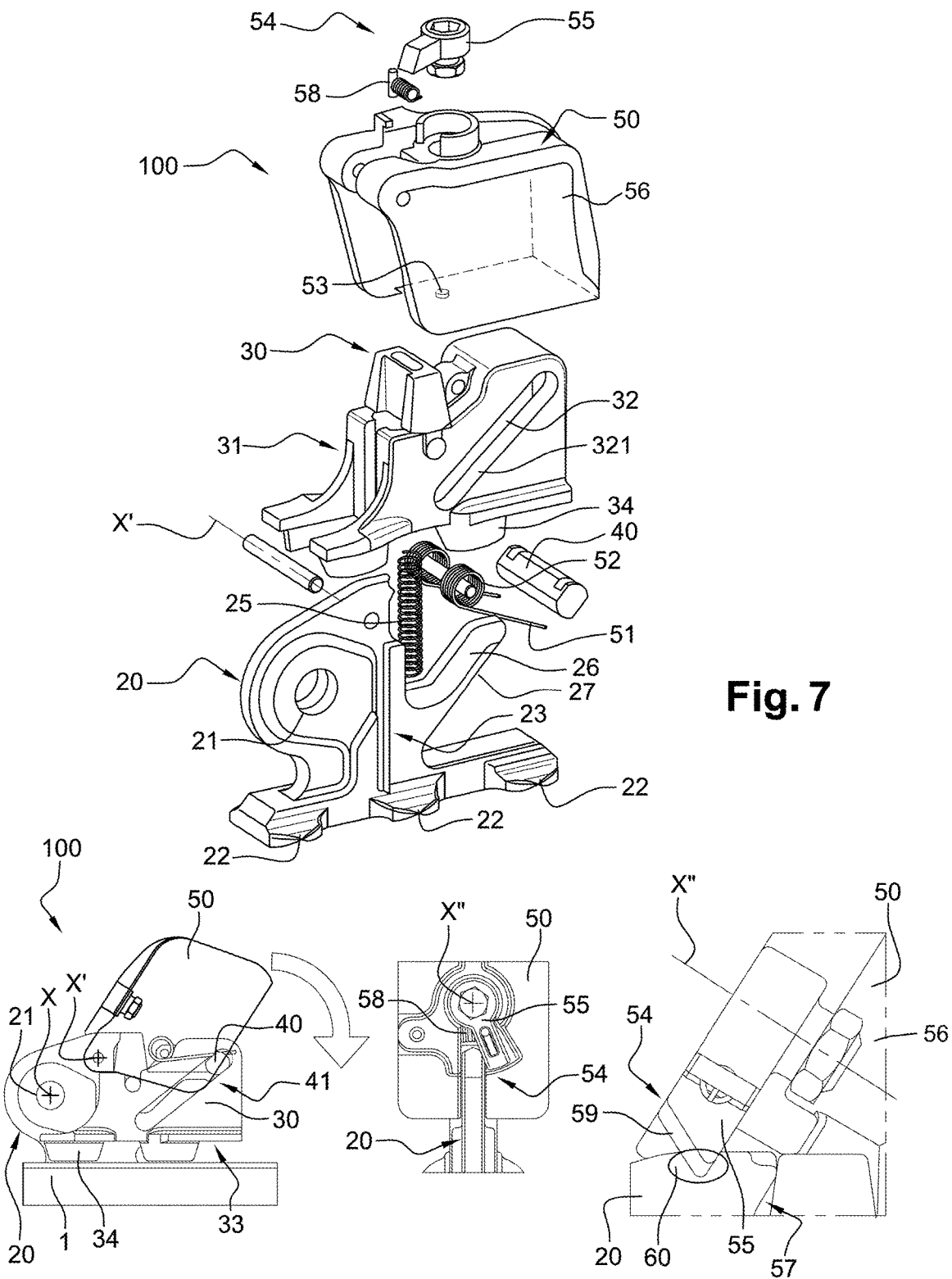

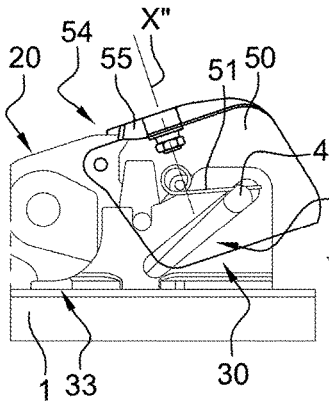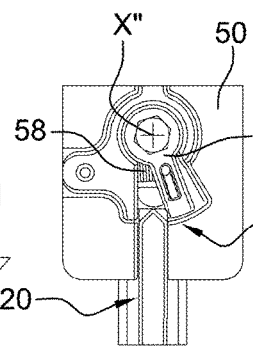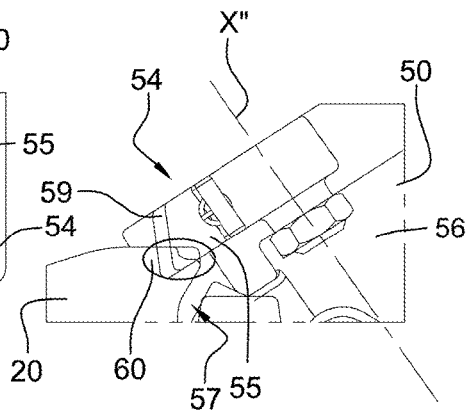
Fig. 8b　　　Fig. 9b　　　Fig. 10b
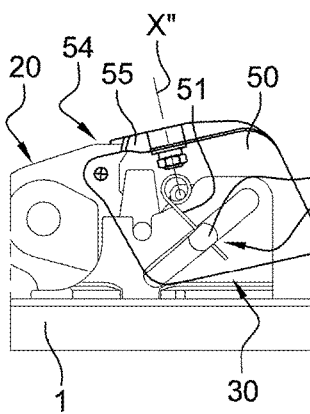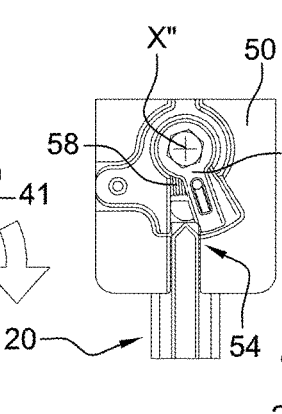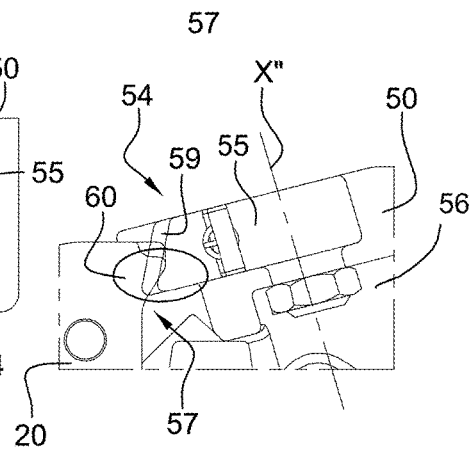
Fig. 8c　　　Fig. 9c　　　Fig. 10c
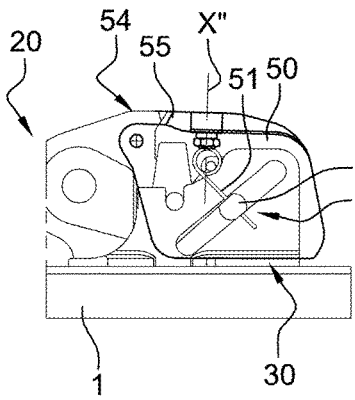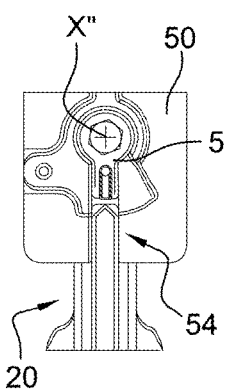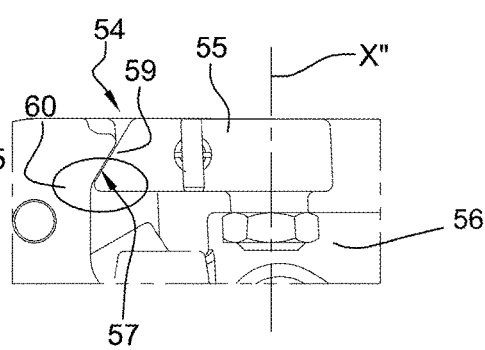
Fig. 8d　　　Fig. 9d　　　Fig. 10d

AIRCRAFT SEAT ATTACHMENT SYSTEM PROVIDED WITH A SYSTEM FOR LOCKING AN ACTIVATION LEVER AND/OR FOR MAINTAINING A CLAMPING FORCE BY FRICTION

CROSS-REFERENCE TO RELATED APPLICATIONS

This application is the U.S. national phase entry of International Application No. PCT/IB2013/058285 filed Sep. 4, 2013, which application is related to and claims priority benefits from U.S. Provisional Application No. 61/696,386 filed Sep. 4, 2012, French Application No. 1354229 filed May 10, 2013, and French Application No. 1354227 filed May 10, 2013.

BACKGROUND OF THE INVENTION

Some embodiments of the invention relate to an aircraft seat attachment provided with a system for maintaining a clamping force by friction. Some embodiments of the invention relate to an aircraft seat attachment provided with a system for locking an activation lever.

Aircraft passenger seats are generally mounted on a rail 1, as shown in FIGS. 1a and 1b. The rail 1 is a section having an upper lip 2 onto which the seat attachment is clamped, this lip 2 being machined to enable the insertion of the lower part of the attachment (bosses) under the lip of the rail.

A seat is generally fixed to the rail by means of at least three attachments, typically four, two at the front of the seat and two at the rear. A passenger seat attachment 3, such as that shown in FIG. 2, must typically fulfill two principal functions, namely:
  clamping the attachment 3 to the lip 2 of the rail to prevent any movement, and
  for the rear attachments, transferring longitudinal loads, for example in the event of a crash, from the seat to the rail.

To this end, the attachment 3 comprises at least one boss 6 to be positioned under the lip 2 of the rail. This boss 6 is either fixed relative to the attachment 3, in which case the attachment 3 includes a plunger 8 configured to vertically translate relative to a body 4 of the attachment (cf. FIG. 2), or the boss 6 is configured to vertically translate relative to the body 4 of the attachment 3.

To fix the seat to the rail 1, the boss 6 enters the hole in the rail and then moves longitudinally along the length of the rail by a half-pitch of the hole to be located under the lip 2 of the rail 1. The boss 6 is then moved vertically in order to come into contact with the lower face of the lip 2 and create a positive clamping action on the lip 2 of the rail.

Two techniques are usually employed to generate the force clamping the attachment to the lip 2 of the rail:
  using a screw to move the boss 6 or the plunger 8 vertically; in this case, a hand tool is necessary and the clamping torque must be controlled in order to guarantee the clamping effect; this solution also enables infinite adjustment, making it possible to compensate for the tolerances of the parts used, or
  using a system with no adjustments, possibly requiring the use of a hand tool, generally using a spring effect of a spring member 9 (spring washer, elastomer block, spring, etc.), enabling geometrical tolerances to be compensated and guaranteeing the required clamping.

If necessary, longitudinal loads are transferred to the rail by a shear member 10 on a lower face of the plunger 8 accommodated in the holes in the rail.

Systems with no adjustment generally employ an activation lever 11. In most cases the lever 11 generates the clamping effect and the line B1 of the clamping force passes through the lever 11, as can be seen in FIG. 2. A locking system 12 is used to hold the lever 11 in place, situated for example at one end of the lever 11. This system 12 is formed by a hook 121, for example, adapted to cooperate with a stud 122 that is part of the body 20 when the lever 11 is in the locked position. However, some of these locking systems do not sufficiently secure the seat to the rail 1. In fact, the lever and/or the locking system often remains in an unstable locking position (cf. FIG. 3), wherein the lever and/or the locking system does not enable the energy peak corresponding to the clamping effect to be maintained in the event of stresses exerted on the attachment, such as vibration. In other systems, this locking position is not clearly identifiable.

SUMMARY OF THE INVENTION

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, an aircraft seat attachment comprises a body adapted to be attached to a seat, a plunger mobile relative to the body, and an activation lever adapted to drive movement of the plunger relative to the body characterized in that the activation lever includes a locking system adapted to go from a first position called the "open position" corresponding to a free state of the activation lever, which can then move relative to the body, to a second position called the "closed position" corresponding to a locked state of the activation lever which is immobilized relative to the body, so that the position of the locking system enables visual detection of the state of the activation lever.

In certain embodiments, the locking system is formed by a latch pivotally mounted to the body of the lever, said latch being respectively disengaged from a receptacle formed in the body of the attachment in the open position and engaged in said receptacle in the closed position.

In some embodiments, the locking system includes a tension spring member, such as a spring, spring-loading the latch in the direction of the closed position.

In certain embodiments, the latch has a beveled shape at a free end adapted to be inserted into the receptacle, said receptacle then having in its upper part a slope of corresponding shape.

According to some embodiments of the present invention, an aircraft seat attachment comprises a body adapted to be attached to a seat, a plunger mobile relative to the body, and an activation lever adapted to drive movement of the plunger relative to the body to enable, in a locked state of said attachment, clamping of a seat fixing rail lip between at least one boss of said body and the plunger, characterized in that it further includes a system for maintaining by friction a force clamping the attachment to the rail in the locked state so that the line of the clamping force passes only through rigid elements comprising the body, the plunger and a friction member of the force-maintaining system, and in that the activation lever does not participate in maintaining said clamping force.

The attachment in accordance with some embodiments of the invention is therefore a self-locking attachment guaranteeing a clamping force that does not rely on a spring system as well as enabling adaptation to dimensional variations of the seat rail.

In some embodiments, the attachment further includes a system for maintaining by friction a force clamping the attachment to the rail in a locked state of the attachment so that the activation lever does not participate in maintaining said clamping force.

In certain embodiments, the friction force-maintaining system includes a wedging member adapted to slide between two plane linear non-parallel faces that are part of said body and said plunger, respectively, this wedging member being adapted to maintain the clamping force by friction once said wedging member has been moved by sliding between the two faces via the activation lever.

In some embodiments, the face of the plunger along which the wedging member can slide corresponds to a face of a slot for guiding the wedging member.

According to certain embodiments, the face of the body along which the wedging member can slide is part of a linear inclined portion of said body.

In some embodiments, the activation lever includes at least one arm that is part of a spring adapted to push on the wedging member to cause it to slide between the faces of the plunger and the body to bring the attachment to the locked state.

In certain embodiments, the activation lever includes at least one claw on an internal face adapted to come into contact with the wedging member so as to move it away from the plunger relative to the body to bring the attachment to an unlocked state.

The invention will be better understood on reading the following description and examining the figures that accompany it. These figures are provided by way of illustration only and are in no way limiting on the invention.

BRIEF DESCRIPTION OF THE DRAWINGS

FIG. 7 shows an exploded perspective view of the attachment according to certain embodiments of the present invention; and FIGS. 8a-8d, 9a-9d, 10-10d respectively show side and plan views of the attachment showing the state of the system for locking the activation lever as well as areas around the receptacle of said locking system during a phase of locking the seat attachment according to certain embodiments of the present invention.

Figure 1A:
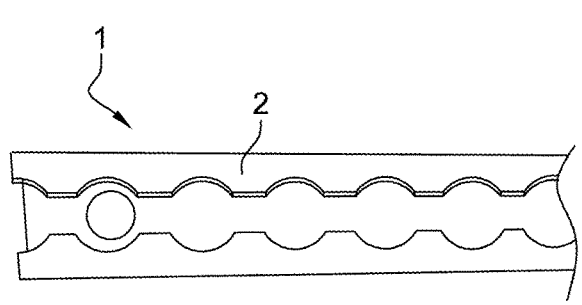
FIGS. 1a and 1b show plan and perspective views of a seat rail onto which aircraft seats are to be fixed by means of attachments according to certain embodiments of the present invention.
Figure 1B:
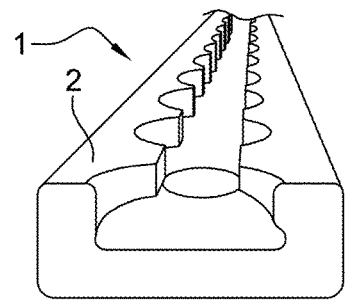

Identical, similar or analogous elements retain the same references from one figure to another.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

FIGS. 4, 5a, 5b, 6 and 7 illustrate embodiments of a seat attachment 100 including a body 20 to which the seat is attached via an opening 21, the axis X of which is substantially transverse to the lengthwise direction of the rail 1 and allows a rod of the seat (not shown) to pass through it. This body 20 includes at least one boss 22 adapted to come to bear against the lip 2 of the seat rail 1.

The body 20 may also include a guide 23 that is configured to mate with a guide 31 of corresponding shape that is part of the plunger 30 so as to allow vertical movement of the plunger 30 relative to the body 20. Where necessary, a return spring 25, as illustrated in FIG. 7, may be used to enable the plunger 30 to be spring-loaded into its rest position away from the body 20, wherein the rest position corresponds to an unlocked state of the attachment 100. The body 20 may also include an inclined linear portion 26 having a lower face 27 adapted to cooperate with a wedging member 40.

The plunger 30 may further include, in addition to the guide 31 and complementary to the guide 23, a slot 32 for guiding the wedging member 40 and a lower face 33 that comes into contact with the upper surface of the rail 1. The plunger 30 preferably also includes, although not required, a shear member 34 adapted to be inserted in a hole in the rail 1 to transmit longitudinal loads from the seat to the rail 1.

The vertical movement of the plunger 30 relative to the body 20 may be controlled by the movement of the wedging member 40 between the non-parallel faces of the body 20 and the plunger 30, namely the lower face 27 of the linear portion 26 and a lower face 321 of the slot 32. The assembly formed by the wedging member 40 and the non-parallel faces 27, 321 may form part of the system 41 for maintaining by friction the clamping force generated by the attachment 100.

When the attachment 100 is in a locked state, i.e. when the rail 1 is clamped between the bosses 22 of the body 20 and the plunger 30, the wedging member 40, after sliding between the face 27 of the body 20 and the face 321 of the plunger 30, is in a position called the final position. The wedging member 40 is then trapped between these two faces 27 and 321.

The angle difference between these two non-parallel contact faces 27, 321 is sufficiently large to enable the attachment 100 to adapt to dimensional variations of the assembly. In this regard, the final position of the wedging member 40 depends on the dimensions of the lip of the rail 1 and of the body 20, the plunger 30, and the wedging member 40.

Furthermore, the angle difference between the two contact faces 27, 321 may be sufficiently small to generate friction such that the wedging member 40 can no longer slide once it has been moved into the final position, as described above. The system 41 may therefore be self-locking in that no other part is required to bring about the locking of the attachment 100 to the rail 1.

To place the system in a locked state, the attachment 100 may include an activation lever 50 pivotally mounted to the body 20 about a horizontal axis X', which is parallel to the axis X of the opening 21 passing through an upper end of the body 20, as best illustrated in FIG. 7.

The activation lever 50 may include arms 51 adapted to push the wedging member 40, where necessary, via notches produced in said wedging member 40 and visible in FIG. 7. The pressure exerted on the wedging member 40 causes wedging member 40 to slide in the slot 32 and then between the faces 27, 321 of the plunger 30 and the body 20 in the direction of the wedging member's final position when the lever 50 rotates in the direction of the rail 1. In some embodiments, as shown in FIG. 7, these arms 51 may be part of two springs 52 attached so that they also bear against an internal face of the lever 50.

If necessary, the lever 50 can also unlock the system 41. To this end, the lever 50 may include at least one claw 53 on an internal face adapted to come into contact with the wedging member 40 when the lever 50 is rotated away from the direction of the rail 1. The claw 53 may be configured to move the wedging member 40 so as to move the plunger 30 away from the body 20 to reduce the clamping force. The lever 50 may therefore enable unlocking of the system 41 by an intentional action of the operator, such as an exaggerated upward movement. In certain embodiments, the lever 50 may have a hollow parallelogram general shape and may include a casing, wherein the plunger 30 and the body 20 are positioned inside the casing when the attachment 100 is in a locked state.

Furthermore, a locking system 54 is clearly visible in FIGS. 7, 9a-9d and 10a-10d, which may provide the function of locking the lever 50, i.e. of retaining the lever 50 in position when the wedging member 40 is in the final position.

To this end, the locking system 54 may include a latch 55 pivotally mounted to a body 56 of the lever 50 about an axis X" substantially perpendicular to an upper face of the lever 50.

This latch 55 can move angularly from a first angular position, called the "open position", in which said latch 55 is disengaged from a receptacle 57 provided in the body 20 of the attachment 100. The open position corresponds to a free state of the activation lever 50, which can then move relative to the body 20 (cf. FIGS. 9a to 9c), to a second angular position, called the "closed position", in which said latch 55 is engaged in the receptacle 57. The closed position corresponds to a locked state of the lever 50, which is then immobilized relative to the body 20 (cf. FIG. 9d). Accordingly, the angular position of the latch 55 enables visual detection of the state of the lever 50.

In order to facilitate movement of the latch 55, the activation lever 50 preferably includes a tension spring member, such as a spring 58, spring-loading the latch 55 in the direction of the closed position. The latch 55 preferably has a beveled shape at its free end 59 adapted to be inserted into the receptacle 57, wherein the receptacle 57 has a slope of corresponding shape in its upper part.

Operation of the attachment 100 in accordance with the invention is described hereinafter with reference to FIGS. 8a-8d, 9a-9d, 10a-10d. As shown in FIGS. 8a and 8b, on pushing the lever 50 downward in the direction of the rail 1, the plunger 30 may descend and its lower face 33 may come into contact with the upper face of the rail 1. Where necessary, the shear member 34 enabling transmission of longitudinal loads is positioned in a hole in the rail 1. The system 41 for locking the lever 50 may be in the free position, and the latch 55, acted on by the spring 58, may slide on a lateral face 60 of a part of the body 20 situated above the receptacle 57. The lateral face 60 therefore prevents angular movement of the latch 55 (cf. FIGS. 9a, 10a).

Once the plunger 30 is in contact with the rail 1, further pushing on the lever 50 has the effect of lifting the seat and the body 20 of the seat attachment until the boss 22 is in contact with the lower face of the lip 2 of the rail 1. As shown in FIGS. 9b and 10b, the system 54 for locking the lever 50 remains in the free position, the latch 55 continuing to slide on the side of the receptacle 57.

The gap between the plunger 30 and the body 20 may be sufficient for the wedging member 40, pushed by the arms 51 of the spring 52, to be inserted between the non-parallel faces 27, 321 of these two parts 20, 30, guided by the slot 32 of the plunger 30. As can be seen in FIG. 8c, the wedging member 40 then reaches its final position corresponding to the locked state of the attachment 100. At this stage of actuation, the attachment 100 may be fixed to the rail 1 but the lever 50 may still be free, the locking system 54 being in the open position in that the latch 55 is still bearing against the lateral face 60 of the body 20 (cf. FIGS. 9c, 10c).

As shown in FIGS. 8d, 9d, 10d, the lever 50 may then be pushed into the closed position in which, by virtue of the action of the spring 58, the latch 55 can engage in the receptacle 57, while being retained laterally by an internal face of the lever 50 that forms an abutment. In the closed position, the latch 55 may be located in a dip in the upper part of the body 20 and therefore may clearly indicate that the system 54 is in place and locked.

Figure 2:
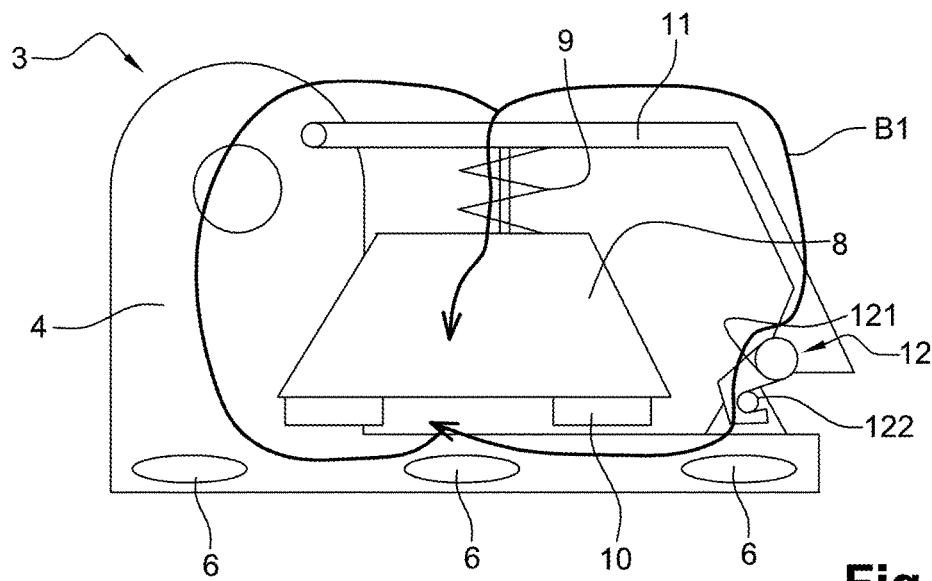
FIG. 2 shows a diagrammatic representation of a prior art seat attachment provided with a spring system for generating the clamping force on the rail.
Figure 3:
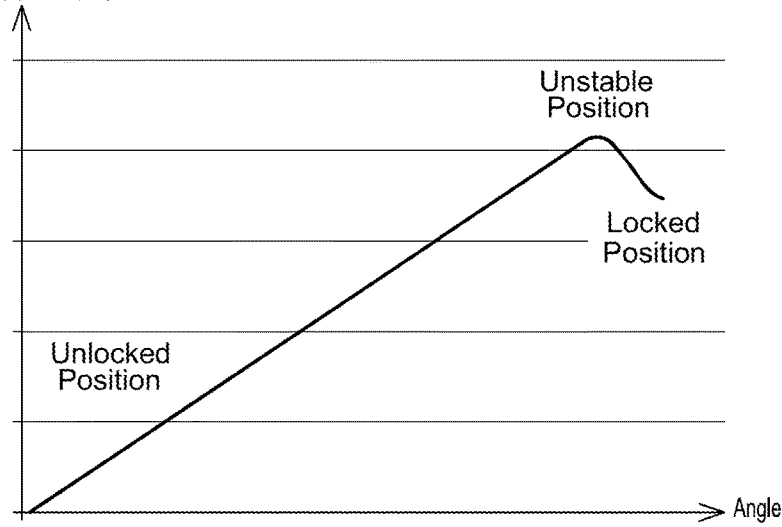
FIG. 3 shows a graphical representation of the energy level on a lever for activating the attachment from FIG. 2 in an unlocked and locked state.
Figure 4:
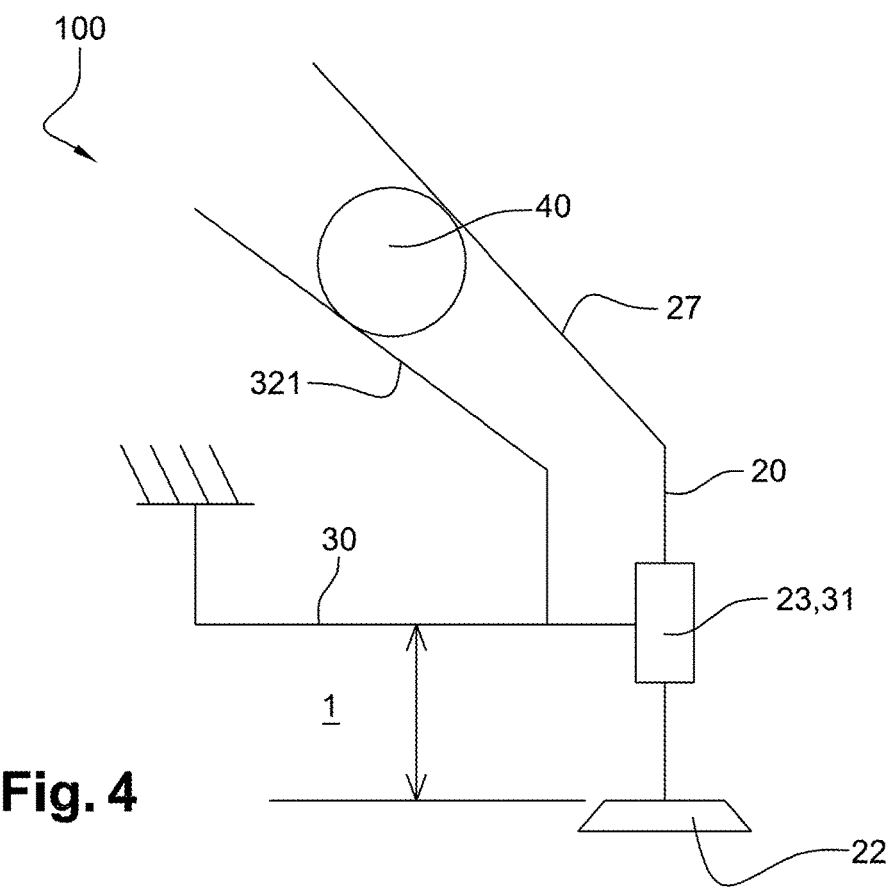
FIG. 4 shows a functional diagrammatic representation of an aircraft seat attachment according to certain embodiments of the present invention.
Figure 5A:
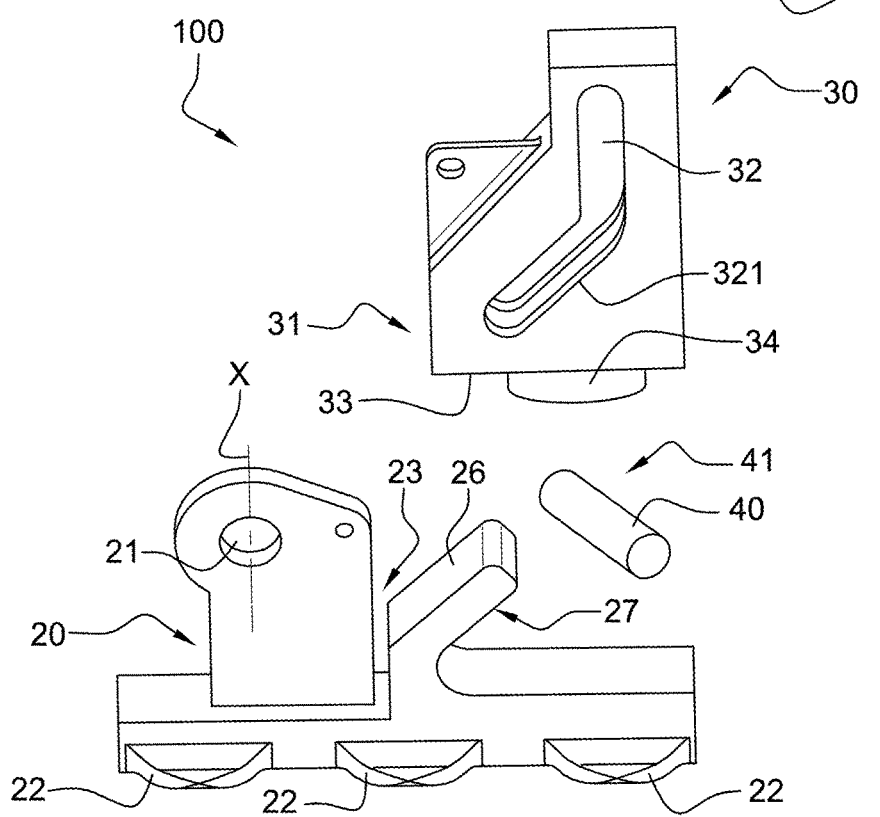
FIGS. 5a and 5b respectively show an exploded perspective view and a side view of the seat attachment according to certain embodiments of the present invention.
Figure 5B:
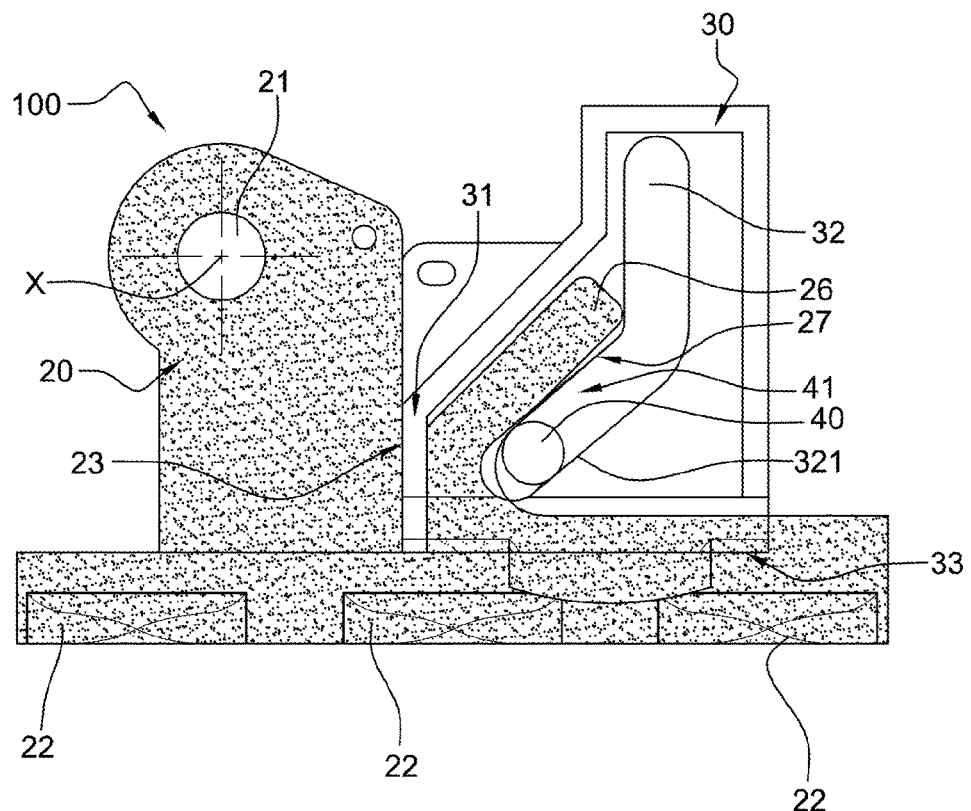
Figure 6:
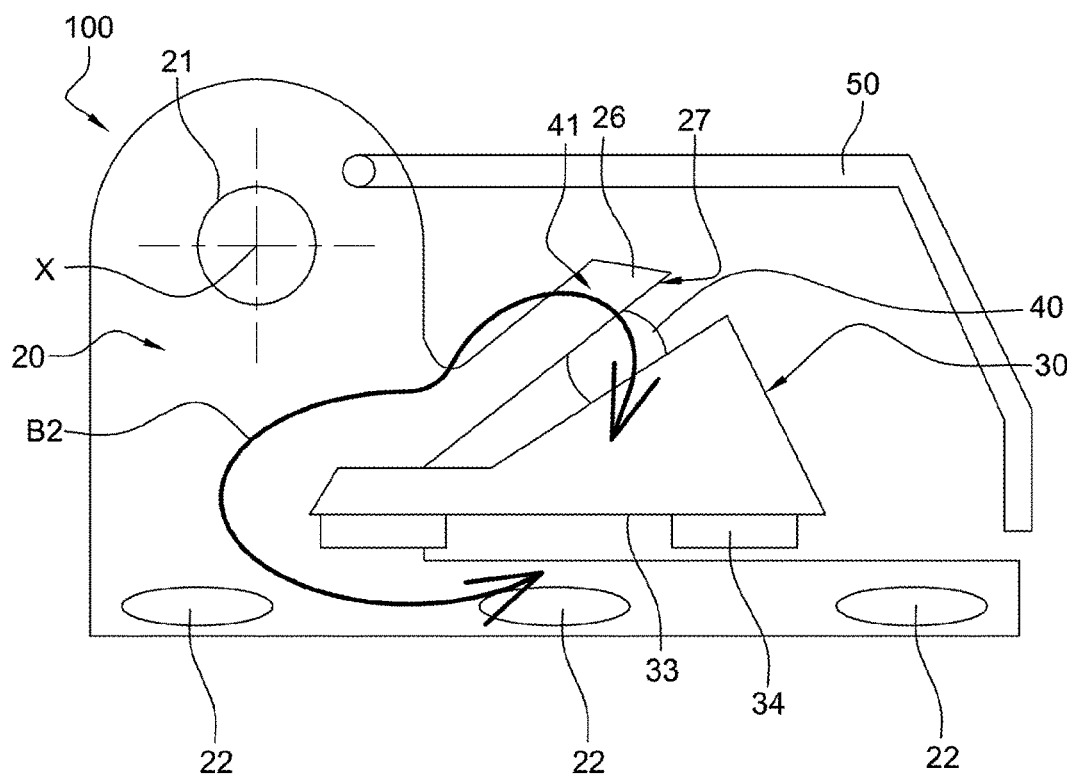
FIG. 6 shows a diagrammatic representation of the seat attachment showing the line of the clamping force according to certain embodiments of the present invention.

Note that when the wedging member 40 is used, the activation lever 50 does not contribute to maintaining the clamping force. As can be seen clearly in FIG. 6, the line of the clamping force B2 does not pass through the activating lever 50, in contrast to the situation in the FIG. 2 configuration. In fact, the lever 50 participates mechanically in arming, during which the pressure exerted on the lever 50 produces a first level of clamping force that is maintained afterwards by the wedging member 40. In some embodiments, the line of the clamping force B2 passes only through the rigid elements comprising the body 20, the plunger 30, and the wedging member 40. In some embodiments, the line of clamping force B2 may not pass through a spring element.

To bring about unlocking, the latch 55 may be moved into an open position using a tool, such as an "Allen" Key®, after which upward movement of the lever 50 can enable disengagement of the wedging member 40 with the aid of the claw 53 to move the plunger 30 away from the body 20.

Of course, the system 54 for locking the activation lever 50 can be used independently of the system 41 for maintaining the clamping force by friction. In fact, the system 54 could therefore be used with the attachment 100 from the aforementioned FIG. 2 generating a clamping force with the aid of spring means. In this case, the configuration of the system 54 for locking the activation lever 50 enables stable maintaining of the energy peak corresponding to the clamping effect whatever the level of stress, in particular vibration, exerted on the attachment 100.

Likewise, the friction force-maintaining system 41 may be used independently of the locking system 54. In fact, the force-maintaining system 41 could therefore be used with the more conventional locking system 12 from FIG. 2 formed by a hook fastened to the lever 50 adapted to cooperate with a stud that is part of the body 20 of the attachment 100.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

What is claimed is:

1. An aircraft seat attachment comprising:
    a body adapted to be attached to a seat,
    a plunger mobile relative to the body, and
    an activation lever adapted to drive movement of the plunger relative to the body, and
    a friction force-maintaining system,
    wherein the activation lever comprises a locking system adapted to go from a first open position corresponding to a free state of the activation lever, which can then move relative to the body, to a second closed position corresponding to a locked state of the activation lever, which is immobilized relative to the body, so that the position of the locking system enables visual detection of a state of the activation lever,
    wherein the friction force-maintaining system is adapted to maintain by friction a force clamping the aircraft seat attachment to a rail in the locked state of the aircraft seat attachment so that the activation lever does not participate in maintaining said clamping force, and
    wherein the friction force-maintaining system includes a wedging member adapted to slide between two plane linear non-parallel faces that are part of said body and said plunger, respectively, the wedging member being adapted to maintain the clamping force by friction once said wedging member has been moved by sliding between the two faces via the activation lever.

2. The aircraft seat attachment according to claim 1, wherein the locking system is formed by a latch pivotally mounted to a body of the activation lever, said latch being respectively disengaged from a receptacle formed in the body of the aircraft seat attachment in the open position and engaged in said receptacle in the closed position.

3. The aircraft seat attachment according to claim 2, wherein the locking system includes a tension spring member spring-loading the latch in a direction of the closed position.

4. The aircraft seat attachment according to claim 2, wherein the latch has a beveled shape at a free end adapted to be inserted into the receptacle, said receptacle then having in its upper part a slope of corresponding shape.

5. The aircraft seat attachment according to claim 1, wherein the face of the plunger along which the wedging member can slide corresponds to a face of a slot for guiding the wedging member.

6. The aircraft seat attachment according to claim 1, wherein the face of the body along which the wedging member can slide is part of a linear inclined portion of said body.

7. The aircraft seat attachment according to claim 1, wherein the activation lever includes at least one arm that is part of a spring adapted to push on the wedging member to cause the wedging member to slide between the faces of the plunger and the body to bring the aircraft seat attachment to the locked state.

8. The aircraft seat attachment according to claim 1, wherein the activation lever includes at least one claw on an internal face adapted to come into contact with the wedging member so as to move the wedging member so as to allow the plunger to move away from the body to bring the aircraft seat attachment to an unlocked state.

9. An aircraft seat attachment comprising:
    a body adapted to be attached to a seat,
    a plunger mobile relative to the body,
    an activation lever adapted to drive movement of the plunger relative to the body to enable, in a locked state of said aircraft seat attachment, clamping of a seat fixing rail lip between at least one boss of said body and the plunger, and
    a friction force-maintaining system comprising a wedging member,
    wherein the friction force-maintaining system is adapted to maintain by friction a force clamping the aircraft seat attachment to a rail in the locked state so that a line of the clamping force passes only through rigid elements comprising the body, the plunger, and the wedging member of the force-maintaining system, and in that the activation lever does not participate in maintaining said clamping force,
    wherein the wedging member is adapted to slide between two plane linear non-parallel faces that are part of said body and said plunger, respectively, the wedging member being adapted to maintain the clamping force by friction once said wedging member has been moved by sliding between the two faces via the activation lever.

10. The aircraft seat attachment according to claim 9, wherein the face of the plunger along which the wedging member can slide corresponds to a face of a slot for guiding the wedging member.

11. The aircraft seat attachment according to claim 9, wherein the face of the body along which the wedging member can slide is part of a linear inclined portion of said body.

12. The aircraft seat attachment according to claim 9, wherein the activation lever includes at least one arm that is part of a spring adapted to push on the wedging member to cause wedging member to slide between the faces of the plunger and the body to bring the aircraft seat attachment to the locked state.

13. The aircraft seat attachment according to claim 9, wherein the activation lever includes at least one claw on an internal face adapted to come into contact with the wedging member so as to move wedging member so as to allow the plunger to move away from the body to bring the aircraft seat attachment to an unlocked state.

14. The aircraft seat attachment according to claim 9, wherein the activation lever includes a locking system adapted to go from a first angular position called an "open position" corresponding to a free state of the activation lever, which can then move relative to the body, to a second angular position called a "closed position" corresponding to the locked state of the activation lever which is immobilized relative to the body, so that an angular position of the locking system enables visual detection of the state of the activation lever.

15. The aircraft seat attachment according to claim 14, wherein the locking system is formed by a latch pivotally mounted to a body of the activation lever, said latch being respectively disengaged from a receptacle formed in the body of the aircraft seat attachment in the open position and engaged in said receptacle in the closed position.

16. The aircraft seat attachment according to claim 15, wherein the locking system includes a tension spring member spring-loading the in a direction of the closed position.

17. The aircraft seat attachment according to claim 15, wherein the latch has a beveled shape at a free end adapted to be inserted into the receptacle, said receptacle then having in its upper part a slope of corresponding shape.

\* \* \* \* \*